United States Patent
Kleinschmidt et al.

(10) Patent No.: US 10,393,169 B2
(45) Date of Patent: Aug. 27, 2019

(54) HYDRODYNAMIC PLAIN BEARING AND EXHAUST-GAS-DRIVEN TURBOCHARGER

(71) Applicants: Bosch Mahle Turbo Systems GmbH & Co. KG, Stuttgart (DE); Martin Berger, Oberderdingen (DE)

(72) Inventors: Ruediger Kleinschmidt, Besigheim (DE); Frieder Stetter, Stuttgart (DE); Steffen Schmitt, Ditzingen (DE); Oliver Kuhne, Stuttgart (DE); Martin Berger, Oberderdingen (DE)

(73) Assignee: BMTS Technology GmbH & Co. KG (DE)

( * ) Notice: Subject to any disclaimer, the term of this patent is extended or adjusted under 35 U.S.C. 154(b) by 0 days.

(21) Appl. No.: 15/678,463

(22) Filed: Aug. 16, 2017

(65) Prior Publication Data

US 2018/0073553 A1 Mar. 15, 2018

(30) Foreign Application Priority Data

Sep. 13, 2016 (DE) .................... 20 2016 105 071 U

(51) Int. Cl.
*F16C 32/06* (2006.01)
*F16C 17/02* (2006.01)
(Continued)

(52) U.S. Cl.
CPC .......... *F16C 17/028* (2013.01); *F01D 25/166* (2013.01); *F16C 17/047* (2013.01);
(Continued)

(58) Field of Classification Search
CPC .... F16C 17/028; F16C 17/047; F16C 17/105; F16C 2360/24
See application file for complete search history.

(56) References Cited

U.S. PATENT DOCUMENTS 2,710,234 A 6/1955 Siegfried et al.
3,265,452 A 8/1966 Pan et al.
(Continued)

FOREIGN PATENT DOCUMENTS

CN 103925296 A 7/2014
DE 2618542 A1 11/1977
(Continued)

OTHER PUBLICATIONS

Machine Translation of JP 9032849.*
(Continued)

*Primary Examiner* — Thomas R Hannon
(74) *Attorney, Agent, or Firm* — Lucian Wayne Beavers; Patterson Intellectual Property Law, PC

(57) ABSTRACT

A hydrodynamic plain bearing having a stator and a rotor rotatable with respect to the stator, a rotor bearing surface being located opposite a counter-surface of the stator in order to generate hydrodynamic pressure. The rotor bearing surface and/or the counter-surface constitutes in a section view, in the context of a section along and through the rotation axis, a continuous bearing contour that is constituted from at least two contour segments. The contour segments are suitable for generating hydrodynamic load capacity in a radial and axial direction. The contour segments are led into one another, by at least one transition segment, in such a way that hydrodynamic load capacity is generatable via the contour segments and the transition segment. The plain bearing is embodied as a multiple-surface plain bearing having two or more lubrication wedges in the region of the contour segments and of the transition segment.

16 Claims, 7 Drawing Sheets

(51) Int. Cl.
   *F01D 25/16* (2006.01)
   *F16C 17/10* (2006.01)
   *F16C 33/10* (2006.01)
   *F16C 17/04* (2006.01)
   *F16C 27/02* (2006.01)
   *F16C 17/18* (2006.01)

(52) U.S. Cl.
   CPC .......... *F16C 17/10* (2013.01); *F16C 33/1075* (2013.01); *F05D 2220/40* (2013.01); *F16C 17/18* (2013.01); *F16C 27/02* (2013.01); *F16C 2360/24* (2013.01)

(56) References Cited

U.S. PATENT DOCUMENTS

| | | | |
|---|---|---|---|
| 3,447,841 A | 6/1969 | Fernlund | |
| 3,578,828 A * | 5/1971 | Orkin | F16C 17/10 384/129 |
| 5,054,940 A * | 10/1991 | Momose | C04B 35/111 384/192 |
| 5,518,319 A | 5/1996 | Selby | |
| 5,789,839 A * | 8/1998 | Langenbeck | F16C 17/105 310/67 R |
| 5,957,587 A | 9/1999 | Hong et al. | |
| 5,971,615 A * | 10/1999 | Choi | F16C 17/10 384/100 |
| 6,664,685 B2 * | 12/2003 | Ameen | F16C 17/10 310/45 |
| 6,776,529 B2 * | 8/2004 | Khan | F16C 33/201 384/107 |
| 6,799,893 B2 * | 10/2004 | Hokkirigawa | F16C 17/10 384/271 |
| 9,366,263 B2 | 6/2016 | Tamaoka et al. | |
| 9,790,812 B2 * | 10/2017 | Ryu | F01D 25/166 |
| 2007/0104400 A1 | 5/2007 | Ito et al. | |

FOREIGN PATENT DOCUMENTS

| | | |
|---|---|---|
| DE | 4217268 C2 | 1/1995 |
| DE | 10028984 C2 | 9/2002 |
| DE | 10261869 A1 | 8/2004 |
| DE | 102008059598 A1 | 6/2010 |
| DE | 102013110409 A1 | 3/2015 |
| EP | 209808 A2 | 1/1987 |
| EP | 780586 A1 | 6/1997 |
| EP | 1482189 A1 | 12/2004 |
| EP | 1972759 A2 | 9/2008 |
| JP | 5594914 U | 7/1980 |
| JP | 02176214 A | 7/1990 |
| JP | 09032849 A | 2/1997 |
| JP | 10068416 A | 3/1998 |
| JP | 10078029 A | 3/1998 |
| WO | 0154613 A2 | 8/2001 |
| WO | 2014105377 A1 | 7/2014 |

OTHER PUBLICATIONS

PCT Search report dated Dec. 16, 2015 in PCT/EP2015/055715, 13 pp. (not prior art).
Co-pending U.S. National Phase U.S. Appl. No. 15/551,061, filed Aug. 15, 2017, 40 pp. (not prior art).
DIN 31 652 Part 1 (16 pages) (Apr. 1983).
DIN 31 652 Part 2 (19 pages) (Feb. 1983).
DIN 31 653 Part 1 (16 pages) (May 1991).
DIN 31 653 Part 2 (8 pages) (May 1991).
DIN 31 653 Part 3 (3 pages) (Jun. 1991).
DIN 31 654 Part 1 (14 pages) (May 1991).
DIN 31 654 Part 2 (9 pages) (May 1991).
DIN 31 654 Part 3 (3 pages) (Jun. 1991).
VDI 2204 Part 1 (33 pages) (Sep. 1992).
VDI 2204 Part 2 (36 pages) (Sep. 1992).
VDI 2204 Part 3 (34 pages) (Sep. 1992).
VDI 2204 Part 4 (16 pages) (Sep. 1992).
Office action dated Oct. 10, 2018 from co-pending U.S. Appl. No. 15/551,061 (not prior art).
English machine translation of DE 102013110409 (not prior art).
Office action dated Oct. 16, 2014 in DE 10 2013 110 409 (not prior art).
English machine translation of the Office action dated Oct. 16, 2014 in DE 10 2013 110 409 (not prior art).
Office action in China Application 201580077957.0 (not prior art).
Search report in China Application 201580077957.0 (not prior art).
English translation of Korea 1020177025861 first office action (not prior art).
English translation of Korea 1020177025861 2nd office action (not prior art).
Office action in China Application 201710812509 (not prior art).
Search report in China Application 201710812509 (not prior art).

* cited by examiner

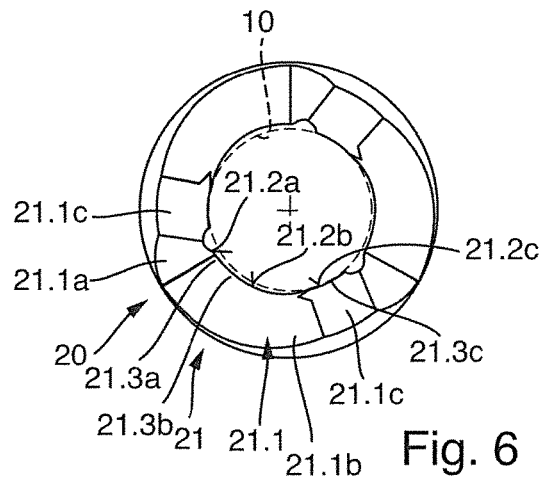
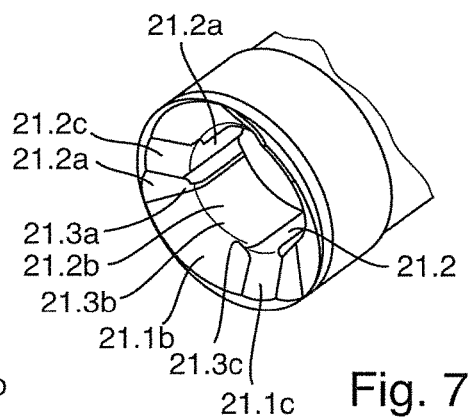
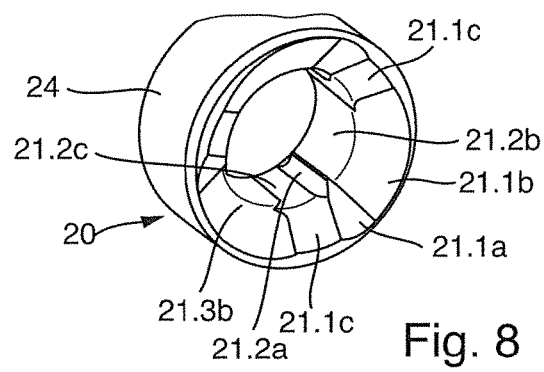
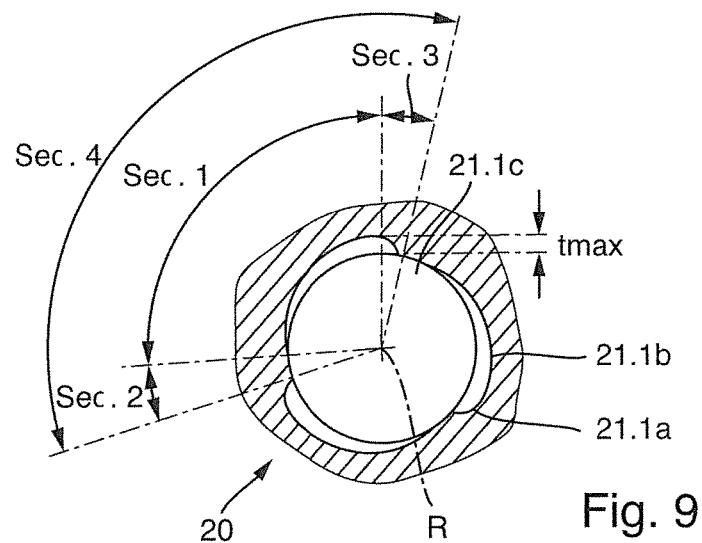

HYDRODYNAMIC PLAIN BEARING AND EXHAUST-GAS-DRIVEN TURBOCHARGER

BACKGROUND OF THE INVENTION

The invention relates to a hydrodynamic plain bearing having a stator and a rotor rotatable with respect to the stator, a rotor bearing surface being located opposite a counter-surface of the stator in order to generate hydrodynamic pressure.

The invention further relates to an exhaust-gas-driven turbocharger having a hydrodynamic plain bearing.

DESCRIPTION OF THE PRIOR ART

Rotating machine elements, for example shafts, track rollers, gear wheels, or pump wheels, require guidance in a radial and axial direction so that forces and torques can be transferred. This task can be taken on by plain bearings that act hydrodynamically. The functionality of this type of bearing is based on the physical principle of hydrodynamic pressure generation. In hydrodynamic plain bearings, a suitable lubricant is held between the rotor and the stator. Upon a rotational motion of the rotor relative to the stator, shear forces are produced in the lubricant and then transport it at a specific speed through the bearing. With a converging bearing gap the result thereof is a hydrodynamic pressure rise; with a diverging gap profile following the converging bearing gap, the result is a pressure drop. If the relative velocity between the rotor and stator is sufficiently high, the result of the hydrodynamic pressure is to build up a lubricant layer that is sufficiently thick to separate the two sliding partners from one another. In this operating state, friction occurs in the lubricant layer (fluid friction). The hydrodynamic pressures thereby generated, in combination with the surface area being used, maintain an equilibrium with the external forces and describe the load capacity of the plain bearing. No additional energy, in the form of compression work or a lubricant volume that is delivered at a specific pressure via grooves or pockets, is needed in order to generate the hydrodynamic pressure. The load capacity is determined by the operating variables. The fundamentals of numerical calculation of hydrodynamic pressure are presented in DIN 31562 Part 1 (DIN handbook 198; Plain bearings 2; Beuth Verlag GmbH; Berlin, Cologne 1991).

Two basic bearing types are found in the existing art:

1. Hydrodynamic radial plain bearings

Hydrodynamic radial plain bearings are often embodied in the form of cylindrical sleeves as a pad-type variant, or as tilting pad bearings (see DIN 31562 Part 2, and VDI Guidelines 2204). The hydrodynamically effective elements (e.g. pads) of the plain bearing are cylindrical, and thus arranged parallel to the rotation axis. The converging gap profile results from the eccentric location of the rotor with respect to the stator.

2. Hydrodynamic axial plain bearing

Hydrodynamic axial plain bearings are embodied in the form of a thrust washer having a variety of grooves or surface modifications in the form of dynamic pressure edges, wedge surfaces, or spiral grooves. They can also be configured as so-called "tilting pad" bearings (see DIN 31563 Parts 1 to 3; DIN 31564 Parts 1 to 3). The axial plain bearing is arranged orthogonally to the rotation axis, with an (as a rule) rotating thrust collar as a counter-member. The converging gap profile required in order to generate hydrodynamic pressure is produced by the conformation of the surface structures (pockets, ramps, etc.), by the inclination of the tiltably movable pads, or by an angular offset between the bearing and the thrust collar.

If both radial and axial loads occur in a technical solution, both of the aforementioned bearing types must then be used. The axial loads are then carried by an axial plain bearing, and the radial loads by the radial plain bearing. One such solution is described in DE 4217268 C2. The two bearing types must then each be calculated and designed separately from one another, resulting in correspondingly high costs for both design and production.

Hydrostatic plain bearings that are correspondingly designed are therefore often used for such load situations. It is necessary in this context to use a pressure pump that, as mentioned earlier, has a constant energy demand. Solutions of this kind are described in the document U.S. Pat. No. 2,710,234 A.

A further possibility is to introduce so-called spiral grooves into the rotor bearing surface, in order thereby to generate a pressure buildup. Such solutions are described in the document U.S. Pat. No. 3,265,452 A. Grooves of this kind entail additional production outlay.

A further possibility for supporting both radial and axial loads is to use so-called spherical bearings or pivoting bearings (EP 1482189A1) or ball joints (DE10028984C2). These are not designed, however, for continuously high sliding speeds due to rotation of the counter-element (rotor) around its axis. The purpose of such bearings is instead to support a shaft offset in a tiltably movable or compensating manner. Swivel bearings as used, for example, in hydraulic cylinders are known in this context. Prosthetic hip joints, for example in accordance with WO0154613A2, perform the same function.

DE 10 2008 059 598 A1 discloses an exhaust-gas-driven turbocharger. It comprises a shaft that carries a turbine wheel and a compressor wheel at its respective ends. The shaft is journaled in a housing by means of two hydrodynamic plain bearings that are embodied in the form of taper bearings.

A further exhaust-gas-driven turbocharger is described in WO 2014/105377 A1 and EP 1972759.

SUMMARY OF THE INVENTION

The object of the invention is to furnish a hydrodynamic plain bearing and an exhaust-gas-driven turbocharger having a hydrodynamic plain bearing, improved utilization properties being achieved.

This object is achieved with the features respectively of the claims.

Provision is thus made according to the present invention that the rotor bearing surface of the rotor and/or the counter-surface constitutes in a section view, in the context of a section along and through the rotation axis, a continuous bearing contour that is constituted from at least two contour segments, the contour segments being suitable for generating hydrodynamic load capacity in a radial and axial direction, the contour segments being led into one another, by means of at least one transition segment, in such a way that hydrodynamic load capacity is generatable via the contour segments and the transition segment; and that the plain bearing is embodied as a multiple-surface plain bearing having two or more lubrication wedges in the region of the contour segments and of the transition segment.

A decrease in coefficients of friction is achieved by the sectorization of the bearing system both in the region of the contour segments and, in particular, in the region of the transition segment. In addition, bearing pressure transfer from the radial bearing region to the axial bearing region is improved with this bearing. Because a continuous transition between the individual contour segments that are responsible for axial and radial load capacity can be created with the transition segment, an increase in load capacity for the same frictional energy, or alternatively a decrease in frictional energy, can be achieved. The occurrence of instabilities in the form of half-frequency oil whirls is actively reduced by the sectorization of the bearing arrangement. This results in less noise emission from the hydrodynamic plain bearing, and internal and external bearing loads are furthermore considerably decreased thereby. The plain bearing according to the present invention also produces an elevated pumping effect, which results in a decrease in oil pressure requirement.

According to a preferred embodiment of the invention, provision is made that at least some of the lubrication wedges of the contour segments and of the transition segment are led into one another so as to result in a continuously differentiable contour profile in an axial bearing direction. A continuous, uninterrupted load capacity over the contour segments and the transition segment is thereby achieved.

One conceivable inventive alternative is such that the contour segments that are led into one another in an axial bearing direction, and the at least one contour segment, each form sectors; and that the sectors of those contour segments and of the at least one transition segment form a bearing sector. It is thereby possible to construct a hydrodynamic plain bearing having several bearing sectors that are arranged with a distribution in a circumferential direction. The bearing sectors can preferably be arranged symmetrically with respect to one another. Each bearing sector serves for the transfer of both radial and axial forces. It is thereby possible to implement plain bearings with which large loads can be transferred in a very small physical space.

A further optimization of load capacity can be achieved by the fact that the contour depths of at least two of the sectors of a bearing sector which are led into one another deviate from one another. It is furthermore conceivable for the cross-sectional shapes of the sectors within a bearing sector to deviate from one another.

Versatile bearing configuration capabilities result in particular when provision is made that one or more of the sectors exhibit, in a circumferential direction, a lubrication wedge and a transition segment leading to the lubrication wedge, and optionally a resting surface.

Provision can be made in the context of the invention that in the range between two and seven bearing sectors are used. The most common bearing tasks can thereby be performed.

The load capacity of the hydrodynamic plain bearing, and pumping capability in terms of the lubricant being conveyed, can be optimized if provision is made that the lubrication wedge exhibits, in a circumferential direction and/or in an axial direction, a linear or curved bearing surface, in particular a concave geometry; and/or that the slope of the contour generating the transition segment proceeds, in a circumferential direction, oppositely to the slope of the adjacent lubrication wedge.

The hydrodynamic plain bearings according to the present invention can comprise resting surfaces or can be such that the lubrication wedge transitions directly into the transition segment. When resting surfaces are used it has proven to be advantageous, in terms of achieving sufficient load capacities, if provision is made that the extent of the resting surfaces in a circumferential direction is between >0% and 50% of the extent of a sector in a circumferential direction. Provision can be made in particular, in the context of the hydrodynamic plain bearings according to the present invention, that the extent of the lubrication wedge in a circumferential direction is in the range between 30% and 100% of the total length of the sector in that direction.

In order to improve lubricant transport and in order to decrease the required lubricant pressure, provision can also be made in the context of the invention that a lubricant groove is provided in at least one bearing sector, the lubricant groove extending at least over a portion of a contour segment or at least over a portion of a contour segment and at least a portion of the transition segment. It is consequently therefore also conceivable for the lubricant groove to extend only over the contour segment that is responsible for the radial load capacity of the bearing. It is also conceivable for the lubricant groove to extend continuously through the entire region of a bearing sector, i.e. in particular including the region of the contour segments and the region that passes through the transition segment. Lastly, it is also conceivable for the lubricant groove to taper off into the bearing geometry at least at one of its ends.

One possible variant of the invention is such that the ratio of the maximum contour depth of a sector in the contour segment to the nominal height of the bearing clearance in the contour segment is selected to be in the range between $0.5 \leq (t_{max}/c) \leq 5$. An optimum compromise in terms of load capacity, rotor dynamics damping, and the avoidance of instabilities in the form of half-frequency oil whirls is thereby achieved in the contour segment. The "bearing clearance" is defined as the difference between the bearing inside diameter and shaft journal diameter (DIN 31 652-1).

According to a further variant of the invention, provision can be made that the ratio of the maximum contour depth of a sector in the contour segment to the nominal height of the bearing clearance in the contour segment is selected to be in the range between $0.5 \leq (t_{max}/c) \leq 6$. An optimum compromise in terms of load capacity and reduction of frictional energy in the contour segment is thereby achieved.

BRIEF DESCRIPTION OF THE DRAWINGS

The invention will be explained below in further detail with reference to exemplifying embodiments depicted in the drawings, in which:

FIG. 6 is an end view of the stator according to FIGS. 3 to 5;

FIGS. 7 and 8 are enlarged perspective views of the stator according to FIG. 6;

FIG. 9 is a schematic section view through the longitudinal center axis of the bearing region of the bearing sleeve according to FIGS. 3 to 8.

DETAILED DESCRIPTION

Figure 1:
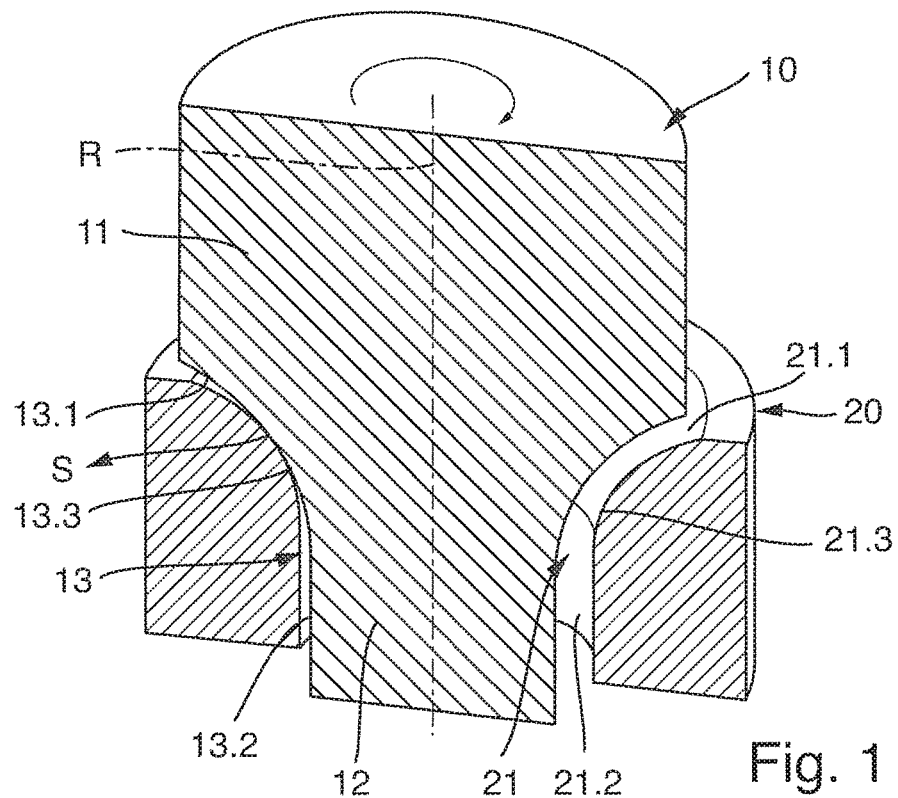
FIG. 1 is a section view schematically depicting a hydrodynamic plain bearing having a rotor and a stator.
Figure 2:
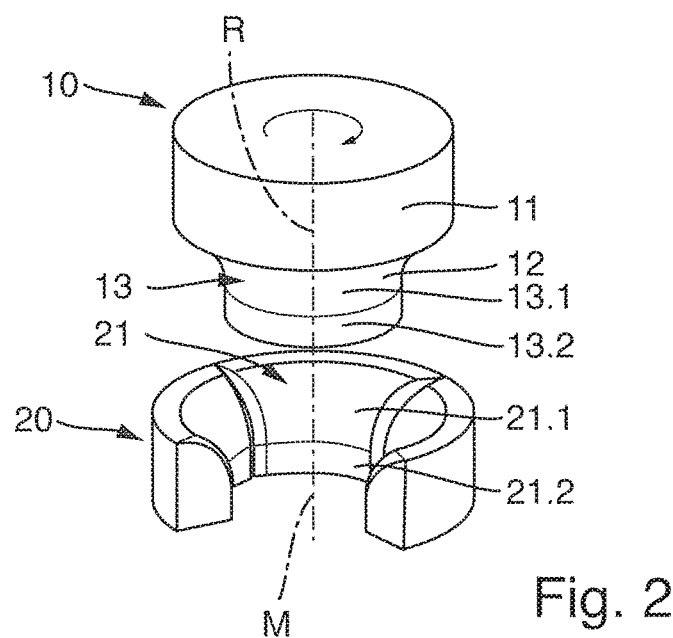
FIG. 2 shows the hydrodynamic plain bearing according to FIG. 1 in a multiple-sector embodiment.

FIG. 1 and FIG. 2 show a hydrodynamic plain bearing having a rotor 10 and a stator 20, a sectioned depiction along rotor axis R of rotor 10 being selected. Rotor 10 possesses an attachment piece 11 adjoining which is a bearing segment 12. A machine component, for example a gear or the like, can be indirectly or directly coupled onto attachment piece 11. Bearing segment 12 possesses an, in particular, rotationally symmetrical rotor bearing surface 13. Rotor bearing surface 13 constitutes a continuous bearing contour in the direction of the rotation axis of the plain bearing. This bearing contour is constituted by two contour segments 13.1 and 13.2 and a transition segment 13.3. The distance of the bearing contour from the rotation axis can consequently vary along the rotation axis (longitudinal center axis) in the context of the invention.

According to the present invention and in particular as shown by the variant embodiment in accordance with FIG. 1, the bearing contour is continuously differentiable in the direction of the rotation axis. With continuously differentiable bearing contours, in particular, a simple numerical bearing calculation is possible and load capacities over the entire bearing contour are possible. Counter-surface 21 can likewise be rotationally symmetrical.

Stator 20 is configured with a receptacle for rotor 10. It comprises a counter-surface 21. This counter-surface 21 constitutes a bearing contour that is generated by a convex curvature and a hollow-cylindrical region. The convex curvature and the hollow-cylindrical region constitute contour segments 21.1, 21.2 and transition segment 21.3. Counter-surface 21 likewise constitutes a continuous bearing contour and, like rotor bearing surface 13, is continuously differentiable in the direction of the rotation axis.

In the context of the invention, stator 20 is arranged in such a way that a relative velocity can be achieved between rotor 10 and stator 20 in order to generate hydrodynamic pressure. Stator 20 can be installed in stationary fashion or can also be embodied rotatably, for example as a floating sleeve.

When the hydrodynamic plain bearing is in the assembled state, rotor bearing surface 13 is located opposite counter-surface 21. As is evident from FIG. 1, the bearing contour of rotor bearing surface 13 can deviate slightly from the bearing contour of counter-surface 21. This is generated using different curvatures for contour segments 13.1 and 21.1. With this feature it is possible, for example, to prevent bearing surface 13 and counter-surface 21 from resting in planar fashion, in particular with full coverage, against one another, in such a way that the geometry present is one that cannot generate a hydrodynamic pressure especially in the startup state of the plain bearing.

FIG. 1 is a symbolic operating depiction of the hydrodynamic plain bearing, in which a gap S converging in an axial and radial direction is produced by the eccentric location of rotor 10 with respect to stator 20 in the left illustration. The lubricant guided between rotor bearing surface 13 and counter-surface 21 generates, in the region of the converging gap, a pressure that determines the load capacity of the hydrodynamic plain bearing. The pressure acts at every point normally to rotor bearing surface 13 and to counter-surface 21. Force components acting both axially and radially with respect to rotation axis R are thereby produced. The integral sum of those force components determines the load capacity of the bearing in both the axial direction and the radial direction.

According to a further variant embodiment of a hydrodynamic plain bearing according to the present invention, rotor bearing surface 13 is constituted by two contour segments 13.1, 13.2, namely by a convex curvature and by a plane surface perpendicular to the longitudinal center axis. Counter-surface 21 has a corresponding contour (contour segments 21.1, 21.2). The two contour segments 13.1 and 13.2 are led continuously into one another in the direction of the rotation axis via a transition segment.

According to a further embodiment of a hydrodynamic plain bearing according to the present invention, rotor 10 possesses a rotor bearing surface 13 having two contour segments 13.1, 13.2. Contour segment 13.1 is constituted by a truncated cone. Contour segment 13.2 is of cylindrical configuration. Transition segment 13.3 between contour segments 13.1 and 13.2 is constituted by a concave curvature. The conformation is such that contour segments 13.1 and 13.2 and transition segment 13.3 transition continuously into one another. Bearing contour 13 is thus continuously differentiable in the direction of rotation axis R.

Counter-surface 21 of stator 20 is correspondingly made up of two contour segments 21.1 to 21.2. Contour segment 21.2 is embodied as a conical receptacle. Adjoining that contour segment 21.1 is contour segment 21.2 constituting a convex curvature. This convex curvature transitions into contour segment 21.2 that is embodied as a hollow cylinder. In the assembled state, contour segments 13.1 and 21.1, 13.2 and 21.2, and transition segments 13.3 and 21, are respectively located opposite one another. With contour segments 13.2 and 21, as a result of the cylindrical configuration only bearing forces in a radial direction are generated. Contour segments 13.1 and 21.1, and transition segments 13.3 and 21.3, respectively generate force components in both a radial direction and an axial direction.

In a further embodiment of a hydrodynamic plain bearing according to the present invention, for example, rotor bearing surface 13 can be made up continuously of two contour segments 13.1, 13.2 and two transition segments 13.3. Contour segment 13.1 can be embodied as a truncated cone having a relatively large opening angle. The first transition segment 13.3 is adjacent, in the form of a concave curvature. Directly adjoining transition segment 13.3 is further transition segment 13.3 in the form of a cylinder. The further transition segment 13.3 transitions into contour segment 13.2, which is embodied as a convex curvature. Stator 20 comprises a counter-surface 21 having two contour segments 21.1 and 21.2. Contour segment 21.1 constitutes a conical receptacle that transitions into a convex curvature that is constituted by first contour segment 21.3. Adjoining first transition segment 21.3 is further transition segment 21.3 in the form of a hollow-cylindrical receptacle. Counter-surface 21 ends with contour segment 21.2 in the shape of a concave curvature. In the assembled state and in operation, the hydrodynamic plain bearing generates radial force components in the region of the oppositely located second transition segments 21.3 and 13.3. The associated contour segments 13.1, 13.2, 21.1, 21.2 and first transition segments 13.1, 21.3, on the other hand, generate both radial and axial force components.

As the statements above illustrate, one, two or more transition segments 21.3, 13.3 can be provided, in addition to contour segments 21.1, 21.2, and 13.1, 13.2, between contour segments 21.1, 21.2, and 13.1, 13.2.

While a hydrodynamic plain bearing is operating, the external force acting on the hydrodynamic plain bearing can vary in terms of its magnitude and direction. The relationship of rotation axis R of rotor 10 to longitudinal center axis M of stator 20 also changes as a result of such a variation. The change can be both an angular offset between rotor axis R and longitudinal center axis M, and a radial offset or an axial offset. It is conceivable in particular for all the types of offset to occur simultaneously. The hydrodynamic plain bearing according to the present invention can react to such a change. Upon such a shift of rotor 10 with respect to stator 20, the location and geometry of converging gap S changes. A change in converging gap S results in a change in the force components in converging gap S which determine the load capacity of the hydrodynamic plain bearing. Because of this change in the geometry of the hydrodynamic gap, varying pressures are attained in those regions and result in an increase in axial load capacity. The axial force that is being applied can thus be compensated for. Similar effects occur when radial loads change, or upon a shift of rotation axis R with respect to longitudinal center axis M.

In the context of the invention it is furthermore possible to modify the pressure generation in converging gap S such that in the region of hydrodynamic gap S, rotor bearing surface 13 and/or counter-surface 21 can have regions having a different coefficient of thermal expansion and/or a different modulus of elasticity. For this, rotor bearing surface 13 and/or counter-surface 21 can have zones having different materials. For example, an aperture, in particular an orifice, which is introduced into rotor 10 and/or into stator 20, can be provided in the region of converging gap S. This aperture can then be filled with a material that has a coefficient of thermal expansion, and/or a modulus of elasticity, which is different from the surrounding material of rotor 10 or of stator 20. For example, a resin material that terminates flush with rotor bearing surface 13 or with counter-surface 21 can be introduced into the recess. It is also conceivable for rotor bearing surface 13 and/or counter-surface 21 to comprise regions having a different coefficient of thermal expansion; in particular, provision can be made that a sub-element, made in particular of ceramic oxide or of another element that has a lower coefficient of thermal expansion than that region of the rotor bearing surface and/or of the counter-surface which indirectly or directly adjoins the sub-element, in the rotor bearing surface and/or in the counter-surface. Examples of a sub-element of this kind are zirconium tungstate, silicon, titanium, steel/iron. Rotor bearing surface 13 and/or counter-surface 21 can be constituted, for example, at least partly from a bronze material, for example having a coefficient of thermal expansion of approx. $18^{-6} K^{-1}$.

FIGS. 3 to 8 show stators 20 in the form of bearing sleeves, in which counter-surfaces 21, described above and shown in FIGS. 1 and 2, are used. These bearing sleeves comprise a center piece 27 adjoining which at both ends are extensions 24. Center piece 27 comprises passages 25 that create access to the internal space surrounded by the bearing sleeve. Extensions 24 have cylindrical outer surfaces 26. Both extensions 24 are equipped with counter-surfaces 21, counter-surfaces 21 of the two extensions 24 preferably being configured identically. The configuration of counter-surface 21 of the right extension 24 of the bearing sleeve will be explained in more detail below. The statements also apply in principle to the left-side extension 24. Counter-surface 21 comprises contour segments 21.1, 21.2. Contour segment 21.1 is embodied substantially in the shape of a truncated cone. Contour segment 21.2 is of substantially cylindrical configuration. The two contour segments 21.1 and 21.2 are led into one another via a transition segment 21.3. Transition segment 21.3 is constituted by a substantially convex curvature. The configuration of contour segments 21.1 and 21.2, and of transition segment 21.3, is evident in more detail from FIGS. 6 to 9. As those drawings show, contour segments 21.1 and 21.2 and transition segment 21.3 are configured in the form of a multiple-surface plain bearing. As is evident from FIG. 9, sectors Sec. 4 are accordingly used, three sectors Sec. 4 being utilized in the present exemplifying embodiment. Sectors Sec. 4 are recessed into the bearing sleeve in the form of depressions. Each sector comprises a respective lubrication wedge 21.1b, 21.2b, and 21.3b. Lubrication wedge 21.1b, 21.2b, and 21.3b is concavely curved. Lubrication wedges 21.1b, 21.2b, and 21.3b exhibit their greatest contour depth tmax in the region of a transition region 21.1a, 21.2a, 21.3a. The contour depth, i.e. the distance from rotation axis R of the plain bearing, decreases continuously proceeding from this transition region 21.1a, 21.2a, 21.3a. This is evident in particular from FIG. 9. This drawing is a section perpendicular to rotation axis R and through contour segment 21.2, which constitutes the substantially cylindrical bearing part of extension 24. As is further shown by this drawing, lubrication wedge 21.1b, 21.2b, 21.3b transitions at its end facing away from transition region 21.1a, 21.2a, 21.3a into a resting surface 21.1c, 21.2c, 21.3c. In FIG. 9, transition region 21.1a, 21.a, 21.3a is labeled "Sec. 3," and resting surface 21.1c, 21.2c, 21.3c is labeled "Sec. 2." The extent of lubrication wedges 21.1b, 21.2b, 21.3b is labeled "Sec. 1." As is evident in particular from FIGS. 6 to 8, one lubrication wedge 21.1b, 21.2b of the first and second contour segment 21.1, 21.2, and one lubrication wedge 21.3b of transition segment 21.3, respectively constitute a bearing sector. For the bearing shown, three bearing sectors are used. A different number of bearing sectors can, of course, also be used. Particularly preferably in the context of the invention, two to eight bearing sectors are used. Lubrication wedges 21.1b, 21.2b, and 21.3b transition continuously into one another in the region of a bearing sector. A continuous, and continuously differentiable, bearing contour is thereby formed in a section view, in the context of a section longitudinally and through rotation axis R. As the drawings further show, transition regions 21.1a, 21.2a, 21.3a and resting surfaces 21.1c, 21.2c, and 21.3c can also transition into one another.

The contour depth of lubricant wedges 21.1b, 21.2b, and 21.3b and the contour depth of resting surfaces 21.1c, 21.2c, and 21.3c do not necessarily need to be the same within a bearing sector. It is instead conceivable for the contour depth t to vary in the direction of rotation axis R.

The composition of sectors Sec. 4 within a bearing sector likewise does not need to be identical. The composition can instead change. For example, provision can be made that only contour segment 21.1 exhibits sectorization and a resting surface, whereas segment 21.2, for example, has no resting surface or sectors and is thus cylindrical in shape.

The contour profile in sectors Sec. 1 and Sec 3 need not obligatorily be concave as depicted in the drawings. Provision can instead also be made that a varying contour profile is provided. For example, linear, degressive, or progressively extending contours or contour segments can also be provided on sectors Sec. 1 and Sec. 3.

Figure 3:
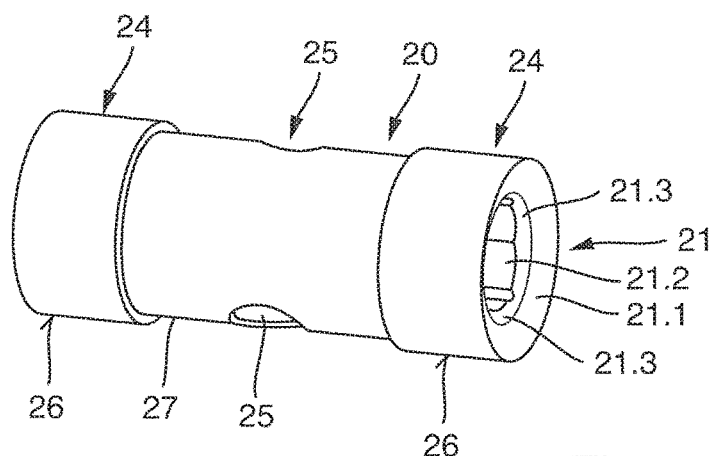
FIGS. 3 to 5 are various views of a stator in the form of a bearing sleeve for an exhaust-gas-driven turbocharger.
Figure 4:
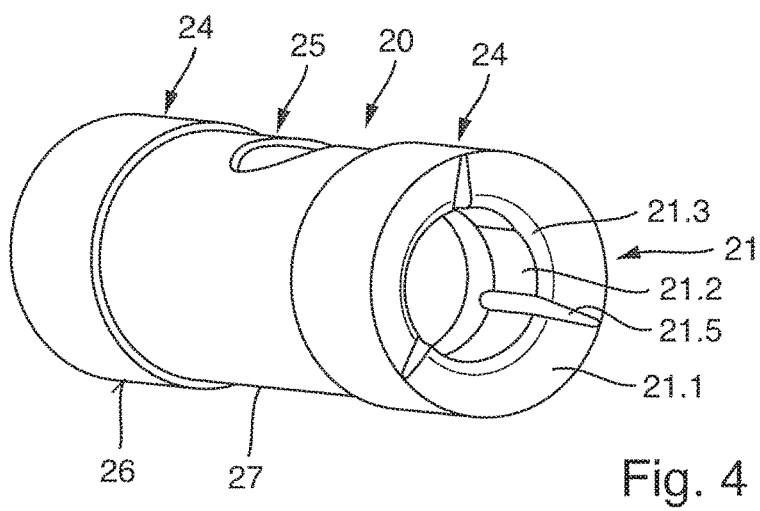
Figure 5:
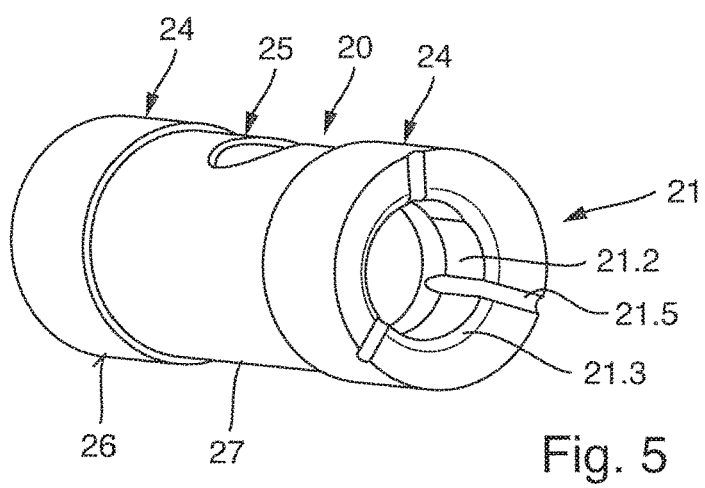

In FIGS. 3 to 5, lubricant grooves 21.5 are provided in the region of contour segments 21.1, 21.2 and in the region of transition region 21.3. Lubricant grooves 21.5 can be provided only in the region of contour segment 21.2, i.e. in the radial part of the bearing contour (FIG. 3). It is also conceivable for lubricant grooves 21.5 to proceed through continuously and to extend through contour segments 21.1, 21.2 and transition region 21.3, as shown in FIG. 5. It is also conceivable for lubricant grooves 21.5 to extend through the two contour segments 21.1, 21.2 and transition region 21.3, and to taper off at the ends of lubricant groove 21.5.

FIGS. 10 to 13 show various variant embodiments of exhaust-gas-driven turbochargers according to the present invention in which the above-described hydrodynamic plain bearings according to the present invention are utilized.

Figure 10:
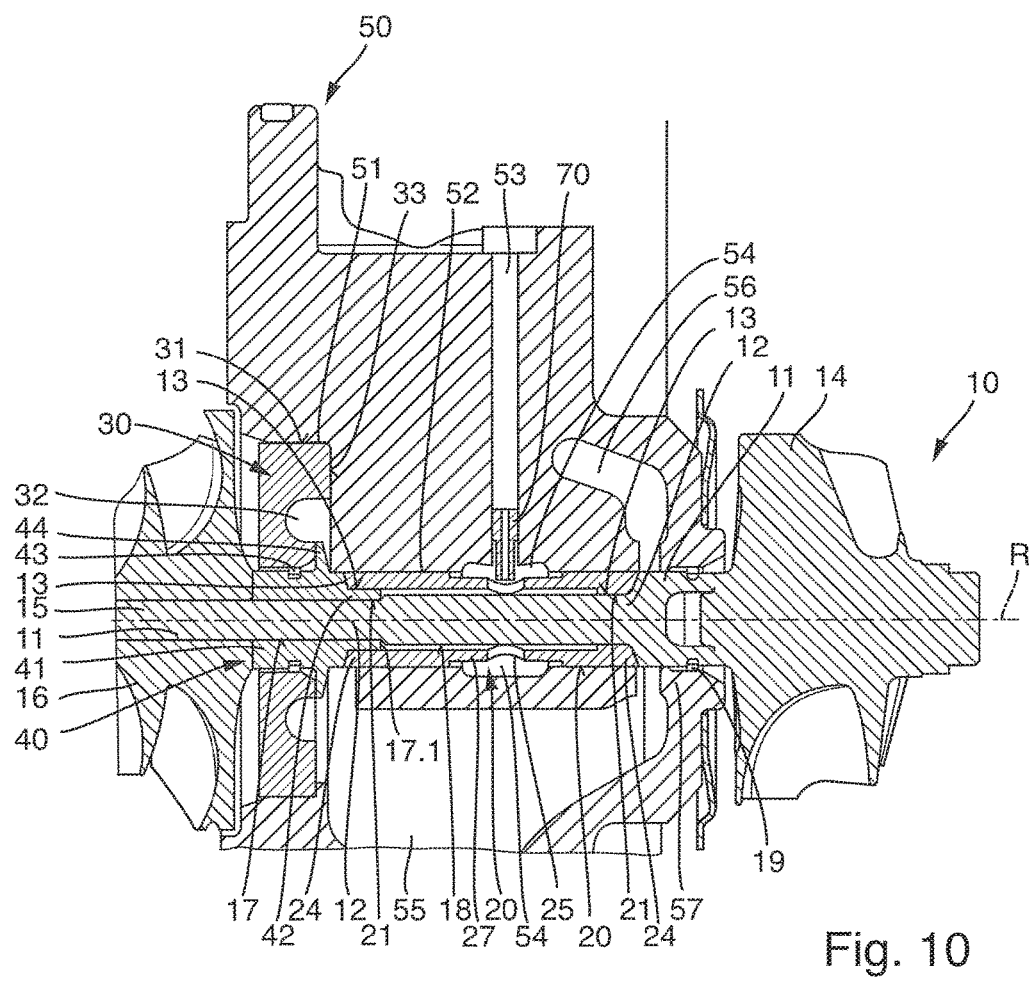
FIGS. 10 to 13 are side views, in section, of various variant embodiments of exhaust-gas-driven turbochargers having hydrodynamic plain bearings, in the form of a partly sectioned depiction of a bearing arrangement of an exhaust-gas-driven turbocharger.

As FIG. 10 shows, the exhaust-gas-driven turbocharger comprises a rotor 10. Rotor 10 possesses a shaft 15 that comprises attachment pieces 11 at its shaft ends. The one attachment piece 11 carries a turbine wheel 14, the other attachment piece 11 a compressor wheel 16.

Rotor 10 comprises two bearing segments 12 that are arranged spaced away from one another in the axial direction of shaft 15, rotor bearing surfaces 13 being constituted in the region of bearing segments 12. In the context of the invention, rotor bearing surfaces 13 can be embodied integrally with shaft 15, but it is also conceivable for rotor bearing surface 13 to be constituted by a bearing piece connected, in particular nonrotatably, to shaft 15. In the case of the exhaust-gas-driven turbocharger depicted in FIG. 10, for example, rotor bearing surface 13 that is associated with turbine wheel 14 is embodied integrally on shaft 15. The left-side bearing segment 12 is constituted by a rotor part 40 that is connected nonrotatably to shaft 15. Rotor part 40 comprises a base part 41 that is penetrated by a receptacle. Rotor part 40 can be slid, with that receptacle, onto a seating surface 17 of shaft 15. The sliding-on motion can be limited by a shoulder 17.1 of shaft 15, against which rotor part 40 comes to a stop axially. Preferably rotor part 40 is axially secured on shaft 15 by means of a tight fit. Rotor part 40 comprises a bearing segment 42 that is shaped integrally onto base part 41. Bearing segment 42 constitutes rotor bearing surface 13 of the left-side bearing segment 12.

Provision can be made in the context of the invention that a rotor bearing surface 13 is not constituted only by shaft 15 or by rotor part 40. Instead, a rotor bearing surface 13 that extends both over part of shaft 15 and over part of rotor part 40 can also be provided.

Rotor part 40 can furthermore comprise a circumferential seal receptacle 43, for example in the form of a circumferential groove and a deflector 44.

Rotor 10 is held in a housing 50, preferably in the receiving housing of the exhaust-gas-driven turbocharger. Housing 50 is penetrated by a bearing receptacle 52. A stator 20 is inserted into this bearing receptacle 52. As FIG. 10 shows, stator 20 can be embodied as a sleeve-shaped insert, one of the bearing sleeves shown in FIGS. 3 to 9 being used in particular. Stator 20 comprises extensions 24 on its long-side ends. Radial outer surfaces 26 of extensions 24 can be of substantially cylindrical configuration. Extensions 24 constitute contour segments 21.1, 21.2 and transition segments 21.3 that are located respectively opposite contour segments 13.1, 13.2 and transition segments 13.3 of rotor bearing surfaces 13. According to the present invention rotor bearing surface 13 and counter-surface 21 of stator 20 can correspondingly be embodied as continuous bearing contours, as mentioned above, in order to bring about axial and/or radial load capacities over the entire bearing contour.

The two extensions 24 are integrally connected to one another via center piece 27.

For assembly, rotor 10 with turbine wheel 14 installed is slid into housing 50 from right to left in the drawing plane of FIG. 10, stator 20 being pre-installed in stationary fashion in housing 50. It is also conceivable, however, for the stator to be mounted axially nondisplaceably, but rotatably, in housing 50. Shaft 15 is slid through stator 20 until rotor bearing surface 13 of the right-side bearing segment 12 is located opposite counter-surface 21 of stator 20. As rotor 10 is slid in, a seal placed into a circumferential seal receptacle 19 then also travels into the region of a sealing surface of housing 50. Rotor part 40 can then be slid onto shaft 15 from the left side until it comes to a stop against shoulder 17.1. Rotor bearing surface 13 of rotor part 40 is then located opposite the left-side counter-surface 21 of stator 20. A seal can be placed into the circumferential seal receptacle 43 of rotor part 40. A bearing piece 30 is then slid over rotor part 40. Bearing piece 30 can be embodied in the form of a cover. It is inserted, sealed with a peripheral surface 31, into an aperture 51 of housing 50. Accurately fitted installation of bearing piece 30 is ensured with a stop 33 of bearing piece 30 that abuts against a counter-surface of housing 50 in the installed state. Bearing piece 30 comprises a diversion region 32 that can be introduced circumferentially, in the form of a spin conduit, into the inner contour of bearing piece 30. Compressor wheel 16 is then slid onto shaft 15 and secured thereon. Compressor wheel 16 comes to a stop against rotor part 40, and is fastened nondisplaceably both axially and radially with respect to shaft 15.

In an alternative installation method, stator 20 can be preinstalled on shaft 15 and slid as a package into the bearing housing, where stator 20 is then fastened in an axial direction with respect to housing 50.

In an alternative embodiment, bearing piece 30 can be omitted. With this embodiment (not depicted) rotor part 40 does not comprise a deflector 44 for installation reasons. Rotor part 40 can, however, continue to comprise a circumferential seal receptacle 43, for example in the form of a circumferential groove for reception of a sealing ring. The sealing ring then abuts against housing 50 rather than against bearing piece 30.

As is further evident from FIG. 10, a lubricant conduit 53 is recessed into housing 50. Lubricant conduit 53 opens into a distributor space 54 that is shaped into housing 50 circumferentially around center piece 27 of stator 20. Stator 20 possesses passages 25. These create a physical communication between distributor space 54 and a cavity 18 arranged between rotor 10 and stator 20. Cavity 18 leads from passages 25 in an axial direction of shaft 15 to the two bearing segments 12. Cavity 18 is in physical communication with the gap region that is constituted between rotor bearing surfaces 13 and counter-surfaces 21 of bearing segments 12. An operating medium, in particular a lubricant, can correspondingly be delivered via lubricant conduit 53 to the two hydrodynamic plain bearings. In particular, the above-described lubricant grooves 21.5 can act in assisting fashion in the context of oil delivery. When rotor 10 is then rotated relative to stator 20 during operational use, a hydrodynamic pressure buildup occurs in the gap region of the two bearing segments 12. Lubricant is continuously conveyed via lubricant conduit 53 and cavity 18 to bearing segments 12, the lubricant passing through the two hydrodynamic plain bearings. Subsequently to the gap region of the left hydrodynamic plain bearing, the lubricant then travels into the region of rotor part 40 and is then spun radially outward via deflector 44. The lubricant then travels into diversion region 32 of bearing piece 30. The lubricant then runs off in the direction of gravity, and is collected in a cavity 55 of the housing.

In the right-side hydrodynamic plain bearing, subsequently to the gap region of the plain bearing the lubricant is spun radially outward from attachment piece 11, the lubricant traveling into the vicinity of a diversion region 56 that is shaped into housing 50. The lubricant then runs off downward in the direction of gravity, and is again collected in cavity 55. Cooling of the housing is achieved with the lubricant, both with diversion region 32 of bearing piece 30 and also, in particular, with diversion region 56 in the region of turbine wheel 14. This represents a considerable additional benefit. In particular, a thermal input occurring during operational use can then be dissipated via the lubricant and kept away from bearing locations 12. The operating reliability of the hydrodynamic plain bearings in high-temperature applications can thereby be guaranteed. The result in particular is to prevent the lubricant from then being exposed to an impermissible temperature stress in the region of bearing segments 12.

In the embodiment in FIG. 10, stator 20 is axially and rotationally fastened by means of a pin 70 engaging into passage 25 of center piece 27. The pin can advantageously be positioned in housing 50 in the oil supply orifice (lubricant supply 35), and engages into passage 25 of stator 20.

The lubricant is collected in cavity 55 and conveyed, optionally via a heat exchanger and a pump, back into lubricant conduit 53.

Figure 11:
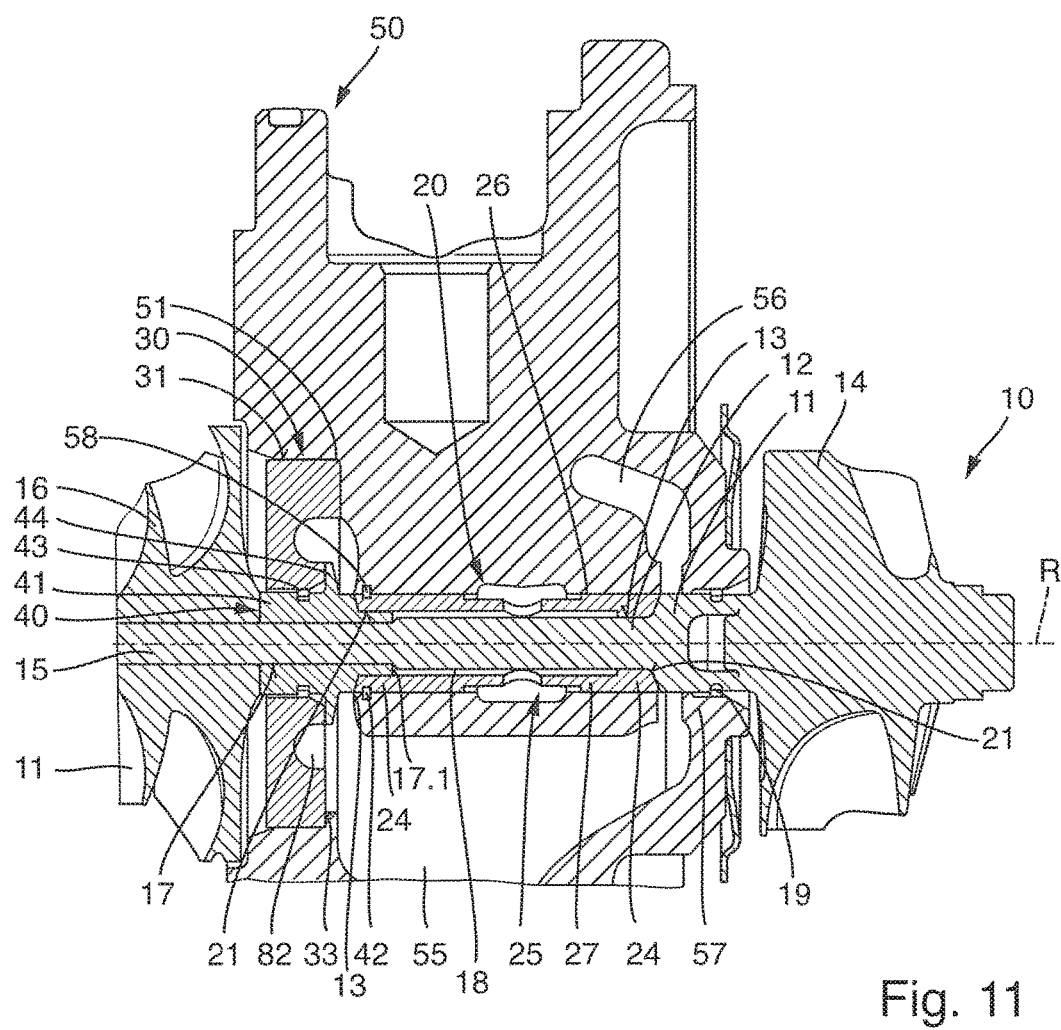

Stator 20 according to FIG. 11 is held in housing 50 with a fastening element 58. Fastening element 58 can be constituted, for example, by a retaining ring, as is evident from FIG. 11.

The technical configuration of the exhaust-gas-driven turbocharger according to FIG. 11 otherwise corresponds to that of FIG. 10, so that reference may be made to the statements above.

Figure 12:
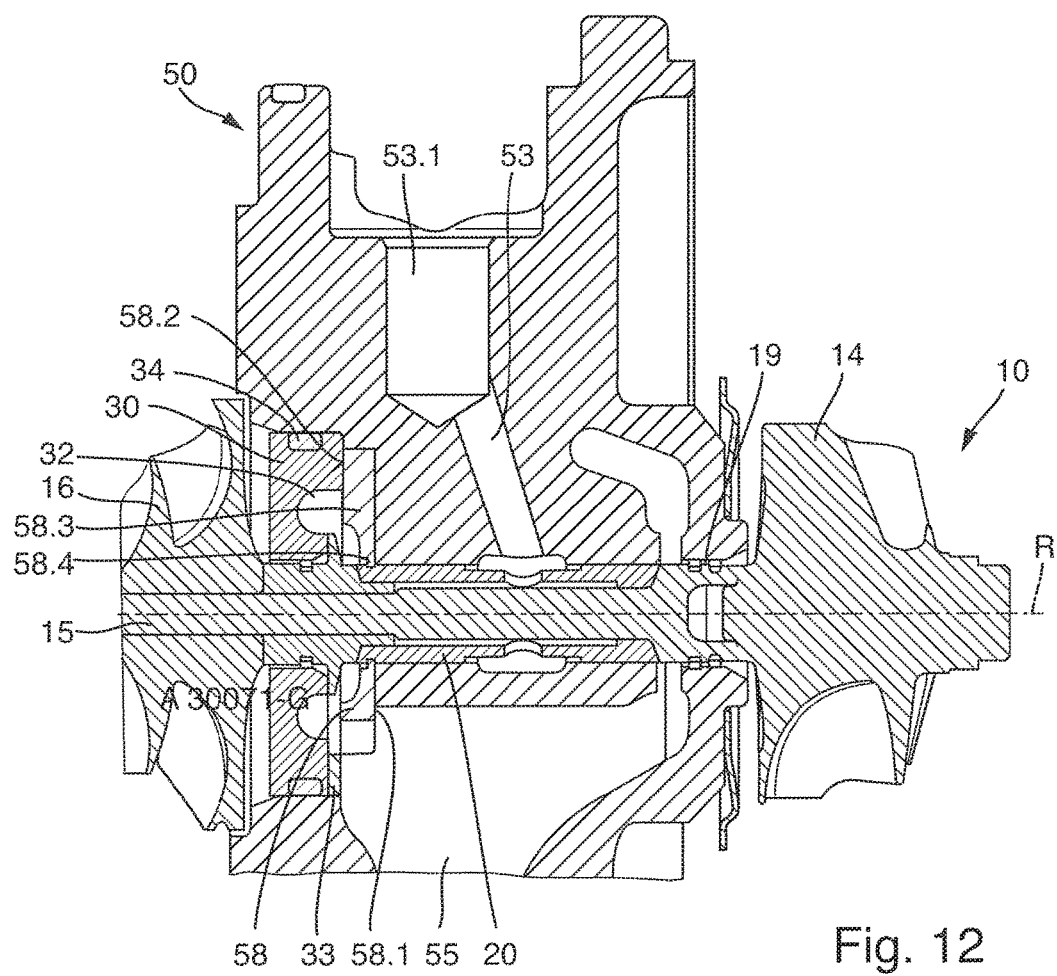

FIG. 12 shows a further variant embodiment of an exhaust-gas-driven turbocharger which corresponds substantially to the conformation in accordance with FIG. 10 and FIG. 11, so that reference may be made to the statements above and only the differences will be discussed.

As is evident from FIG. 12, a double seal having two sealing receptacles 19 is used for an improved sealing effect in the region of supporting segment 57 of housing 50.

Lubricant conduit 53 proceeds from a supply line 53.1 of housing 50, which can be embodied in the form of an attachment thread.

Stator 20 is held in both a circumferential direction and an axial direction by means of a fastening element 58. Fastening element 58 comprises a base element 58.3 that comprises a seating surface 58.1 and a support surface 58.2. A fastening extension 58.4 adjoins base element 58.3. Fastening extension 58.4 engages into a fastening receptacle of stator 20 in order to secure the latter. Fastening element 58 can be embodied for this purpose in two-part fashion, so that fastening extensions 58.4 can be inserted into the circumferential groove of stator 20. It is also conceivable, however, for fastening extension 58.4 to be mounted, as an elastically deflectable latching element, on the one-piece fastening element 58. Fastening element 58 is embodied in such a way that both axial forces and forces in a circumferential direction can be absorbed in order to immobilize the stator in an axial direction and a circumferential direction.

As is apparent from FIG. 12, fastening element 58 constitutes an extraction contour adjacently to the gap region of the hydrodynamic plain bearing. This contour ensures that lubricant travels via fastening element 58 into diversion region 32 of bearing piece 30.

Lastly, it is apparent from FIG. 12 that bearing piece 30 carries a seal 34 on its outer periphery. Bearing piece 30 can thereby be reliably sealed with respect to housing 50. Fastening element 58 is inserted into a receptacle of housing 50 in such a way that it comes to a stop with its seating surface 58.1 against a counter-surface of housing 50. Support surface 58.2 serves as an abutment for stop 33 of bearing piece 30.

Figure 13:
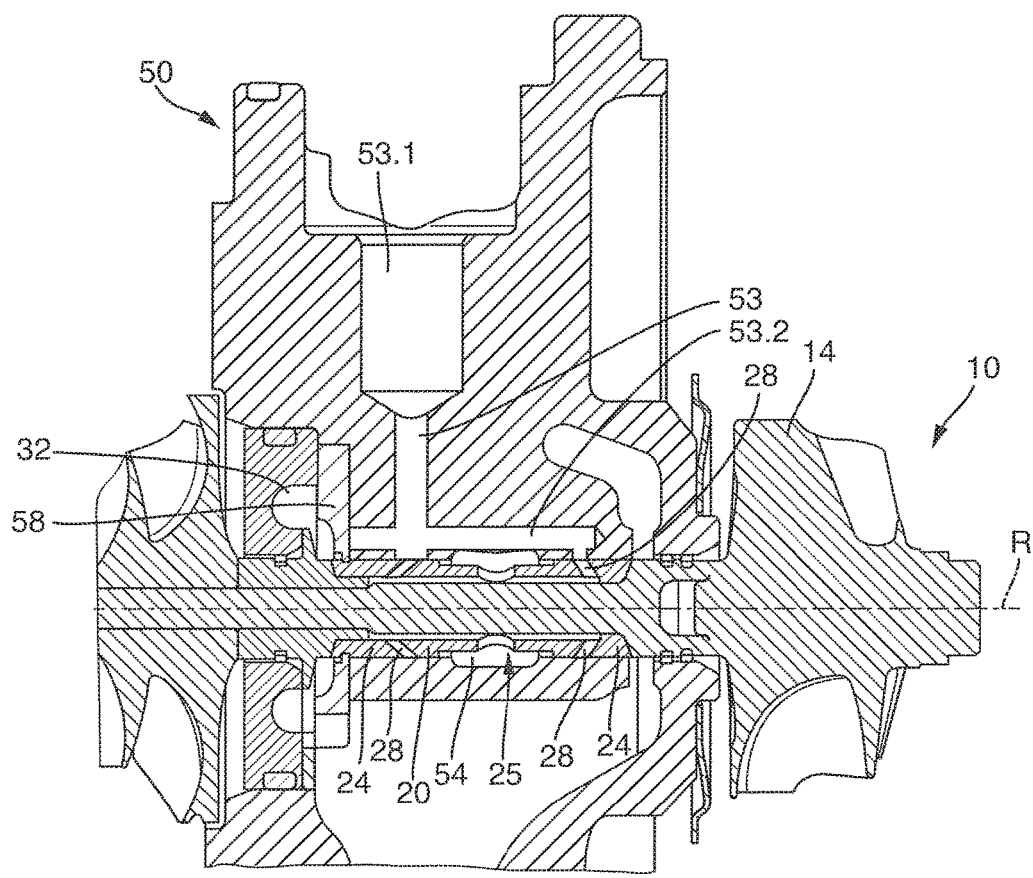

FIG. 13 shows a further variant embodiment of an exhaust-gas-driven turbocharger, the conformation of this exhaust-gas-driven turbocharger corresponding substantially to that of the exhaust-gas-driven turbocharger of FIG. 12, so that reference may be made to the statements above.

In contrast to the exhaust-gas-driven turbocharger according to FIG. 12, the exhaust-gas-driven turbocharger according to FIG. 13 has a modified lubricant supply system. A supply line 53.1 that opens into lubricant conduit 53 is accordingly provided. Lubricant conduit 53 transitions into two supply lines 53.2. Supply lines 53.2 open into infeeds 28 of stator 20. Infeeds 28 are in physical communication with the gap region of the two hydrodynamic plain bearings for lubricant supply purposes.

As has already been mentioned above, stator 20 can be axially and nonrotatably connected in housing 50 in different ways.

The invention claimed is:

1. A hydrodynamic plain bearing, comprising:
a rotor including a rotor bearing surface;
a stator including a counter-surface located opposite the rotor bearing surface in order to generate hydrodynamic pressure;
the rotor being rotatable with respect to the stator about a rotation axis;
wherein at least one of the rotor bearing surface and the counter-surface includes in a section view along and through the rotation axis, a continuous bearing contour including at least two contour segments, the continuous bearing contour being configured to generate hydrodynamic load capacity in a radial direction and an axial direction;
wherein the contour segments are led into one another by at least one transition segment, such that hydrodynamic load capacity is generatable by the contour segments and the at least one transition segment; and
wherein at least one of the rotor bearing surface and the counter-surface includes two or more lubrication wedges on at least one of the contour segments or the at least one transition segment.

2. The hydrodynamic plain bearing of claim 1, wherein:
the two or more lubrication wedges are included on both of the contour segments and the at least one transition segment; and
at least some of the lubrication wedges of the contour segments and of the at least one transition segment are led into one another so as to result in a continuously differentiable contour profile in an axial direction parallel to the rotation axis.

3. The hydrodynamic plain bearing of claim 1, wherein:
the contour segments and the at least one transition segment each form angular sectors defined about the rotation axis, the sectors of the contour segments and of the at least one transition segment forming a bearing sector.

4. The hydrodynamic plain bearing of claim 3, wherein:
the contour segments and the at least one transition segment of a given bearing sector have contour depths deviating from one another where the contour segments and the at least one transition segment are led into one another.

5. The hydrodynamic plain bearing of claim 3, wherein:
one or more of the bearing sectors include, in a circumferential direction, one of the lubrication wedges and a transition region leading into the lubrication wedge.

6. The hydrodynamic plain bearing of claim 5, wherein:
the one or more of the bearing sectors further includes a resting surface.

7. The hydrodynamic plain bearing of claim 3, wherein:
the contour segments and the at least one transition segment form from two to seven bearing sectors.

8. The hydrodynamic plain bearing of claim 3, wherein:
the contour segments and the at least one transition segment of a given bearing sector have cross-sectional shapes deviating from one another.

9. The hydrodynamic plain bearing of claim 1, wherein:
each of the lubrication wedges includes a concave bearing surface.

10. The hydrodynamic plain bearing of claim 1, wherein:
the contour segments and the at least one transition segment each form angular sectors defined about the rotation axis, the sectors of the contour segments and of the at least one transition segment forming a bearing sector;
one or more of the bearing sectors include, in a circumferential direction, one of the lubrication wedges and a transition region leading into the lubrication wedge, and a slope of the transition region proceeds, in the circumferential direction, oppositely to a slope of the lubrication wedge.

11. The hydrodynamic plain bearing of claim 1, wherein:
a ratio of a maximum contour depth of each of the lubrication wedges to a nominal height of a bearing clearance is in a range from 0.5 to 5.

12. The hydrodynamic plain bearing of claim 1, wherein:
a ratio of a maximum contour depth of each of the lubrication wedges to a nominal height of a bearing clearance is in a range from 0.5 to 6.

13. The hydrodynamic plain bearing of claim 1, wherein:
the contour segments and the at least one transition segment each form angular sectors defined about the rotation axis, the sectors of the contour segments and of the at least one transition segment forming a bearing sector; and
one or more of the bearing sectors include, in a circumferential direction, a transition region, one of the lubrication wedges, and a resting surface, wherein a circumferential extent of the resting surface is between 0% and 50% of a circumferential extent of the bearing sector.

14. The hydrodynamic plain bearing of claim 1, wherein:
the contour segments and the at least one transition segment each form angular sectors defined about the rotation axis, the sectors of the contour segments and of the at least one transition segment forming a bearing sector; and
an extent of each lubrication wedge in a circumferential direction is in a range from 30% to 100% of a total extent of the respective bearing sector in the circumferential direction.

15. The hydrodynamic plain bearing of claim 1, further comprising:
a lubricant groove extending at least over a portion of one of the contour segments.

16. The hydrodynamic plain bearing of claim 1, in combination with an exhaust-gas-driven turbocharger.

* * * * *